United States Patent Office

2,809,163
LUBRICANT COMPOSITION

Elmer B. Cyphers, Cranford, and Jeffrey H. Bartlett, Westfield, N. J., assignors to Esso Research and Engineering Company, a corporation of Delaware No Drawing. Application February 19, 1954,
Serial No. 411,548

1 Claim. (Cl. 252—46.7)

The present invention relates to an improvement in lubricant additives and more particularly to an additive which has the combined properties of improving the viscosity index, depressing the pour point, and imparting extreme pressure characteristics to lubricating oils and the like.

The present application is a continuation-in-part of application Serial No. 209,208, filed February 2, 1951 and now abandoned, which in turn is a continuation-in-part of Serial No. 35,054, filed June 24, 1948, now Patent No. 2,562,776.

For many purposes it is highly desirable to employ a lubricant which has greater load-carrying properties than ordinary mineral base lubricating oils. It is also frequently desirable, in the use of mineral lubricating oils, to add to such oils a material which will keep them fluid at low temperatures and will also increase their viscosity at higher temperatures. A uniform or substantially uniform viscosity over a wide range of temperatures is very desirable where operating temperatures vary considerably and particularly where unit loads borne by bearing or other mechanical elements to be lubricated are high.

In the prior art it has commonly been considered necessary to add several materials to lubricating oils to accomplish the various purposes referred to above. Thus, where it has been desirable to increase the unit load-carrying capacity of a lubricant various extreme pressure agents have been incorporated in lubricants. These have usually included a composition capable of releasing free or active phosphorus, sulfur, or chlorine, which, when the ordinary lubricating film fails, will immediately react with the metal to form a protective metal sulfide, phosphide, chloride, or the like, on the surface of the metal.

The present invention has for its object the production and use of a single composition which may be added to mineral base lubricants and the like to impart all or at least several of the desirable characteristics mentioned above. Thus, the material with which this invention deals has extreme pressure properties, tends to lower the pour point, and also may improve the viscosity index of mineral lubricating oils. It incorporates all the various chemical and physical elements and properties which produce these separate results.

The preferred material for accomplishing the results outlined above is a high molecular weight condensation product which is prepared by combining halogenated esters or halogenated polyesters with a suitable metal salt of an alkylated phosphorus-sulfur compound having alkyl groups averaging more than 10 and not substantially more than 16 carbon atoms. Such a material may be prepared, for example, by condensing a metal salt, preferably an alkali metal salt, of a suitable alkyl thiophosphoric acid, or thiophosphorus acid, or a mixture thereof, with halogenated aliphatic materials such as fatty esters, polyesters, copolymers of two or more esters, or halogenated copolymers of one or more aliphatic esters with other unsaturated compounds, such as styrene, isobutylene and the like. The type of esters and polymers etc., which may be employed for condensation with the metal salts are set forth more fully hereinafter. The invention will be more fully described by references to certain specific compositions and methods of preparation.

Example I

A halogenated ester material was produced by charging into a three liter three necked flask the following materials:

348 g. mono-chlormaleic anhydride
1037.5 g. commercial mixture of $C_{10}$ to $C_{18}$ aliphatic alcohols, known as "Lorol B," predominating in lauryl alcohol and averaging about 13.5 carbon atoms per molecule [1]
1.5 g. sulfosalicylic acid
300 cc. straight run solvent naphtha

[1] "Lorol B" alcohols are all straight chain alcohols, having the following distribution:

| | Wt. percent |
|---|---|
| $C_{10}$ | 3 |
| $C_{12}$ | 46 |
| $C_{14}$ | 24 |
| $C_{16}$ | 10 |
| $C_{18}$ | 17 |

The flask was equipped with a thermometer, a reflux condenser and a water trap. The material was heated and refluxed for 14 hours at a temperature of 250°–275° F. During this refluxing a total of 50 cc. of water was collected. The resulting mixture was diluted with 500 cc. of benzol and then given three washes with a 5% aqueous solution of sodium carbonate, followed by three water washes. Thereafter the solvents were removed by evaporation on a steam bath and the resulting product was an ester having the following inspections:

Saponification number _____ 333.7
Neutralization number _____ 3.19
Percent chlorine _____ 6.54
Saybolt viscosity at 210° F_____ 48.5

The ester produced above, which may be referred to as an alkyl chlormaleate wherein the alkyl radical was a mixture of $C_{10}$ to $C_{18}$ straight chain radicals averaging about 13.5 carbon atoms per molecule, was next copolymerized with vinyl acetate.

A one liter four necked flask, equipped with a thermometer, a stirrer, and a condenser, was next charged with 540 grams of the alkyl chlormaleate produced by the process described above. After the ester was heated to 158° F. the air was displaced with nitrogen and 6.0 grams of benzoyl peroxide were added. The mixture was then blown again with nitrogen to remove any traces of air and 60 grams of vinyl acetate were added through the condenser. The mixture was then allowed to polymerize for 16 hours at 158° F. The resulting copolymer was of a very viscous consistency and on analysis was found to have a chlorine content of 5.94% by weight.

The copolymer produced as described above was next condensed with a thiophosphate of sodium as will next be described.

To 830 grams of the commercial mixture of aliphatic alcohols mentioned above and commonly known as "Lorol B," there were added 222 grams of phosphorus pentasulfide ($P_2S_5$) with stirring at room temperature. After thorough mixing, the temperature was raised slowly to 210° F. and was held at that point for 3½ hours. Thereafter the product was cooled and filtered. During this operation a reaction occurred which appears to be substantially as follows:

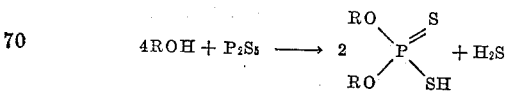

where R is the mixed aliphatic alcohol radical.

The sodium salt of the above described dialkyl dithiophosphoric acid was prepared by neutralization with sodium hydroxide. 7.7 grams of sodium hydroxide were dissolved in 320 cc. of warm absolute ethyl alcohol and this mixture was poured slowly into 106 grams of thiophosphoric acid compound obtained in the foregoing reaction. The mixture was stirred constantly during the addition of the sodium hydroxide. The resulting solution contained the sodium salt of dialkyl dithiophosphoric acid and this was filtered for use in the condensation reaction which followed.

It will be understood that in lieu of sodium hydroxide ammonia, ammonium hydroxide, other metal hydroxides, oxides or alkoxides could be used to prepare the corresponding salt of the alkylated thiophosphate or thiophosphite. For example, potassium or lithium hydroxide or sodium methoxide, ethoxide, etc., could be used if desired.

The condensation reaction between the ester or polyester compounds described above and the metal salt of the alkyl thiophosphoric acid was carried out by first heating the copolymer and the alcoholic solution of the metal salt. 250 grams of the copolymer of alkylated chlormaleate and vinyl acetate were heated to a temperature of approximately 150° F. To this was added the entire amount of the ethyl alcohol solution of the sodium salt of thiophosphoric acid described above. The salt of thiophosphorous acid could be added in a similar manner if desired. The latter solution was added gradually over a period of 15–20 minutes. Thereafter the mixture was heated to refluxing temperature (178° F.) and was refluxed continuously for a period of 5 hours. At the end of the refluxing period the mixture was allowed to cool and settle and it separated into two layers.

The two layers were separated by drawing off the upper layer which contained most of the alcohol. Thereafter, both layers were treated to remove the volatile solvent by evaporation with the aid of added benzol and nitrogen. The materials obtained from the respective layers and their sulfur, phosphorus, and chlorine contents, respectively, are indicated in the following data:

|  | Extract (top layer) | Raffinate (bottom layer) |
| --- | --- | --- |
| Yield, grams | 97 | 231.5 |
| Sulfur, percent | 7.18 | 1.65 |
| Phosphorus, percent | 3.98 | 0.82 |
| Chlorine, percent | 0.65 | 4.47 |

*Example II*

Instead of the "Lorol B" chlormaleate and vinyl acetate copolymer of Example I, a chlorinated coconut oil was reacted with sodium di("Lorol B")dithiophosphate. The procedure was as follows:

To 34 gms. of sodium methylate (0.6 mol.+5% excess) in 400 cc. of absolute ethyl alcohol (diluent) were added 305 gm. of di-Lorol B thiophosphoric acid (0.6 mol) with constant stirring. To this mixture was added 175 gms. of chlorococonut oil, produced by passing gaseous chlorine into coconut oil until the product contained about 24% chlorine, corresponding to 6 chlorine atoms per mol, or 2 atoms per fatty acid chain. The quantity used was calculated so that approximately one-half of the chlorine would be removed, thus giving a product having an average formula as follows:

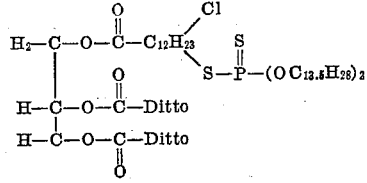

The above mixture of ingredients was stirred and refluxed at about 180° F. for 6 hours. The alcohol was removed by evaporation on a steam bath with a stream of nitrogen and the product filtered. Analysis showed:

Weight percent

Sulfur ------------------------------------------ 6.13
Phosphorus ------------------------------------- 3.77
Chlorine --------------------------------------- 7.56

This analysis indicates that the above formula is approximately 60% complete.

EXTREME PRESSURE PROPERTIES

10% of above product in mineral oil of SAE 90 grade carried 51 lbs. load on the Timken machine, with a scar width of 1.95/64 inch, or 33,600 lbs./sq. in. On the SAE machine it carried 150 lbs. scale load at 1000 R. P. M. and and 14.6/1 slip ratio.

POUR DEPRESSANT PROPERTIES

The chlorococonut thiophosphate of Example II was tested for pour depressant properties in 1.0% concentration in 3 base stocks as tabulated below. Also included in the table are coconut oil and chlorococonut oil which were used in preparing the thiophosphate.

| Pour Depressant | Concentration, Wt. Percent | ASTM Pour Points | | |
| --- | --- | --- | --- | --- |
| | | Mid-Continent Neutral Oil, with 3½% Bright Stock | Mid-Continent Extracted Oil, SAE 10 | Pennsylvania Neutral Oil, 180 SSU Viscosity @100° F. |
| None | | +30 | +20 | +5 |
| Coconut Oil | 1.0 | +30 | +20 | +5 |
| Chlorococonut Oil | 1.0 | +30 | +20 | +5 |
| Chlorococonut Thiphosphate | 1.0 | −25 | −20 | −20 |

The halogenated esters from which the final condensation products are formed may include monomeric and polymeric esters which have been halogenated, for example, halogenated (preferably chlorinated) coconut oil, lard oil, blown rapeseed oil, fumarate polymers, acrylate polymers, etc.

The invention, as described above, thus comprises several important but related aspects. When 0.02–20% of the condensation product is added to an oil, the oil, either mineral base or synthetic (preferably the former for reasons of economy), may be used directly or may be marketed as a concentrate of the additive, to be further diluted as desired. The proportions also depend on the purpose, as pointed out below.

The additive itself also may be marketed for use in lubricating oils, cutting oils, extreme pressure compounds, greases, hydraulic oils and the like. The additive, in general terms, is seen to consist essentially of a condensation product of metal alkyl thiophosphorus salt (e. g. metal alkyl thiophosphate or phosphite), with an organic, preferably aliphatic halogen-containing material.

The halogenated material particularly preferred for the present invention is chlorinated esters, especially the chlorinated natural fatty oils, such as chlorinated coconut oil, lard oil, sperm oil, and closely related materials. While chlorine is the preferred halogen, other halogen particularly bromine and iodine may be used.

The quantity of additive which should be employed in a lubricating oil will depend largely upon the use to be made thereof. As will be noted from the above table, a very small amount shows an important effect upon the pour point of the oil. For this purpose as little as .02% by weight of the product, may be used, although normally the quantity will be from 0.1–1% or 2% by weight. On the other hand, for improving the viscosity index or for carrying heavy loads, as an extreme pressure lubricant, the quantity employed is preferably considerably more, for example, 2–20% of the total lubricant. A quantity of the order of 5–15% is preferred; for example, 10% being recommended for normal extreme pressure use.

Since the chlorine content of the additive of this invention is an important factor, chlorination of the ester, prior to reacting with the thiophosphate, should be so conducted that 1–4 chlorine atoms, preferably about 2, are attached to each carboxy ester group. The chlorinated ester should be reacted with sufficient thiophosphate salt that 25% to not more than 75% of the salt is removed in the condensation reaction. The latter reaction should be carried out at a temperature within the range of 150°–400° F. for ½ to 20 hours, preferably 1–6 hours.

Any of the aliphatic alcohols containing or averaging more than 10 and not substantially more than 16 carbon atoms, particularly 12–14 carbon atoms may be used in making the thiophosphate. Alcohols or alcohol mixtures having or averaging 13–14 carbon atoms per molecule are preferred. Thus, lauryl alcohol and alcohol mixtures predominating in lauryl alcohol may be used, as well as alcohols derived by reduction of natural fatty oils such as coconut oil, palm kernel oil, babassu oil, or fatty oil mixtures predominating in these oils.

The chain length of the alkyl groups in the thiophosphate has been found to be critical particularly for the pour point depressing characteristics of the condensation products of the invention. This is illustrated by Example III below.

*Example III*

A condensation product A was prepared from chlorinated coconut oil and sodium di-normal-decyl dithiophosphate by a procedure analogous to that described in Example II, as follows:

To 17 grams of sodium methylate (0.3 mol+5% excess) in 200 cc. of absolute ethyl alcohol (diluent) was added 123 grams of didecyl thiophosphoric acid (0.3 mol) with constant stirring. To this mixture was added 87.5 grams of chlorococonut oil produced by passing gaseous chlorine into coconut oil until the product contained about 24% chlorine, corresponding to 6 Cl atoms per mol or 2 atoms per fatty acid chain. This mixture was stirred and refluxed at about 175° F. for 6 hours. The alcohol was evaporated on the steam bath with a stream of nitrogen and the product filtered. Analysis showed:

| | Wt. percent |
|---|---|
| Sulfur | 7.03 |
| Phosphorus | 3.28 |
| Chlorine | 8.64 |

A condensation product B was prepared from chlorinated coconut oil and sodium di-normal-cetyl dithiophosphate in essentially the same manner, except that 173.4 grams (0.3 mol) of dicetyl thiophosphoric acid were used in place of the didecyl thiophosphoric acid. Analysis showed:

| | Wt. percent |
|---|---|
| Sulfur | 5.34 |
| Phosphorus | 3.12 |
| Chlorine | 6.35 |

The pour depressing properties of products A and B were determined as described in Example II and compared with those of the chlorococonut-Lorol-B thiophosphate of Example II. The results of this comparison are tabulated below.

| Pour Depressant | Concentration, Wt. Percent | ASTM Pour Points | | |
|---|---|---|---|---|
| | | Mid-Continent Neutral Oil, with 3½% Bright Stock | Mid-Continent Extracted Oil, SAE 10 | Pennsylvania Neutral Oil, 180 SSU Viscosity @100° F. |
| None | | +30 | +20 | +5 |
| A (Chlorococonut-C₁₀ thiophosphate) | 1 | +30 | +20 | |
| B (Chlorococonut-C₁₆ thiophosphate) | 1 | +20 | −5 | |
| Chlorococonut-C₁₃.₅-thiophosphate | 1 | −25 | −20 | −20 |

The above data show that the product obtained from the C₁₀ thiophosphate has no pour point depressing characteristics, while the condensation product in accordance with the preferred embodiment of the invention is an excellent pour point depressor. The product obtained from the C₁₆ thiophosphate still has some, though rather weak, pour point depressing characteristics.

It is also noted that the pour point depressing characteristics of condensation products having straight chain alkyl groups of the chain length herein disclosed are superior to similar products having branched chain alkyl groups. Therefore, when pour point depressancy is the most important characteristic of the condensation products of the invention, such products having straight chain alkyl groups are preferred.

The base stock into which these additives are incorporated may be petroleum or synthetic hydrocarbon oils of the lubricating oil viscosity range, or lighter oils, such as those of the kerosene, gas oil, etc. range which are especially suitable for use as hydraulic fluids.

It will be understood that the invention contemplates the manufacture and marketing of the additive per se as a composition of matter and also contemplates its manufacture and sale as an ingredient of prepared lubricating compositions. The material may be used in greases, metal working lubricants, etc. as well as in lubricating oils and it will be understood that various conventional additives such as oxidation inhibitors, rust inhibitors, tackiness agents, and the like, may be included as will be obvious to those skilled in the art.

What is claimed is:

A lubricating composition comprising a major proportion of a mineral lubricating oil and about 1 wt. % of the condensation product of a sodium dialkyl dithiophosphate, the alkyl groups thereof containing from 10 through 18 straight chain carbon atoms each, and an average of 13.5 carbon atoms, and chlorinated coconut oil containing about 2 chlorine atoms per fatty acid chain.

References Cited in the file of this patent
UNITED STATES PATENTS

| 2,494,332 | Cyphers | Jan. 10, 1950 |
| 2,529,304 | Mikeska | Nov. 7, 1950 |